(12) United States Patent
Metke et al.

(10) Patent No.: US 7,561,551 B2
(45) Date of Patent: Jul. 14, 2009

(54) METHOD AND SYSTEM FOR PROPAGATING MUTUAL AUTHENTICATION DATA IN WIRELESS COMMUNICATION NETWORKS

(75) Inventors: Anthony R. Metke, Naperville, IL (US); Donald E. Eastlake, III, Milford, MA (US); Zhi Fu, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 381 days.

(21) Appl. No.: 11/380,118

(22) Filed: Apr. 25, 2006

(65) Prior Publication Data

US 2007/0248050 A1 Oct. 25, 2007

(51) Int. Cl.
*H04W 4/00* (2009.01)
(52) U.S. Cl. ............... 370/331; 370/310; 370/351; 370/352
(58) Field of Classification Search .............. 370/310, 370/331, 351, 352; 713/169
See application file for complete search history.

(56) References Cited

U.S. PATENT DOCUMENTS

| | | | |
|---|---|---|---|
| 7,174,018 B1 * | 2/2007 | Patil et al. ............... | 380/258 |
| 2003/0135734 A1 | 7/2003 | Fagan et al. | |
| 2003/0226017 A1 | 12/2003 | Palekar et al. | |
| 2004/0225806 A1 * | 11/2004 | Emura et al. ............. | 710/305 |
| 2004/0250076 A1 * | 12/2004 | Kung ..................... | 713/175 |
| 2005/0188193 A1 * | 8/2005 | Kuehnel et al. .......... | 713/155 |
| 2005/0228893 A1 * | 10/2005 | Devarapalli et al. ....... | 709/228 |
| 2006/0053290 A1 * | 3/2006 | Randle et al. ............ | 713/169 |
| 2006/0227725 A1 * | 10/2006 | Huotari et al. ............ | 370/254 |
| 2007/0162751 A1 * | 7/2007 | Braskich et al. .......... | 713/169 |
| 2007/0286362 A1 * | 12/2007 | Coleson et al. .......... | 379/88.16 |
| 2007/0291669 A1 * | 12/2007 | Perkinson ............... | 370/310 |

FOREIGN PATENT DOCUMENTS

| | | |
|---|---|---|
| GB | 2453059 A | 3/2007 |
| WO | 2007127547 A2 | 11/2007 |
| WO | 2007127547 A3 | 11/2007 |

OTHER PUBLICATIONS

PCT Application No. PCT/US2007/064390 Response To Communication Dated Jan. 16, 2009-2 pages.
PCT International Form 345 (CMC About Article 19) Application No. PCT/US2007/064390 Dated Dec. 5, 2009 - 1 Page.
PCT International Preliminary Examination Report Application No. PCT/US2007/064390 Dated Nov. 6, 2008 - 8 Pages.
PCT International Search Report Application No. PCT/US2007/064390 Dated Jul. 15, 2008 - 8 Pages.

* cited by examiner

*Primary Examiner*—Nick Corsaro
*Assistant Examiner*—Amanuel Lebassi
(74) *Attorney, Agent, or Firm*—Randi L. Karpinia

(57) ABSTRACT

A method and system for propagating mutual authentication data in both a first wireless communication network and a second wireless communication network is useful for unifying wireless communication networks. The method includes mutually authenticating a first node operating in the first network and a second node operating in the second network (step 205). A unification message is then transmitted from the first node to a third node operating in the second network, where the unification message indicates that the first node is authenticated with the second network (step 210). In response to the unification message, authentication messages from the third node and the second node are then relayed through the first node, for mutually authenticating the third node and the second node (step 215).

20 Claims, 3 Drawing Sheets

METHOD AND SYSTEM FOR PROPAGATING MUTUAL AUTHENTICATION DATA IN WIRELESS COMMUNICATION NETWORKS

FIELD OF THE INVENTION

The present invention relates generally to establishing trust between wireless network nodes, and in particular to propagating mutual authentication data between nodes operating in different wireless communication networks.

BACKGROUND

Mobile devices such as cellular phones, personal digital assistants (PDAs) and notebook computers often require authentication when accessing remote databases or networks. Devices are generally authenticated through an Infrastructure Access Point (IAP), such as a base station, which is connected to an authentication server. An authentication request can be transmitted using an Extensible Authentication Protocol (EAP) comprising EAP Over Local Area Network (EAPOL) packets. The authentication process involves several EAPOL packets being transmitted and received, beginning with an EAP Start packet and finishing with either an EAP Success message packet or an EAP Failure message packet. The authentication server stores the authentication credentials of a mobile device (typically called a supplicant) that is being authenticated. Authentication servers also can be connected to other authentication servers to obtain supplicant authentication credentials that are not stored locally.

In prior systems, a centralized procedure is followed where a single IAP handles an authentication process for all supplicants within range of the IAP. Prior systems which adhere to American National Standards Institute/Institute of Electrical and Electronics Engineers (ANSI/IEEE) 802.1X or ANSI/IEEE 802.11i standards utilize such a centralized procedure. Because every supplicant can be authenticated only via the IAP, such a centralized procedure is not practical in multi-hop networks. In the ANSI/IEEE standards, the process of authentication of mobile devices is defined, and the standards discuss a supplicant, an authenticator and an authentication server, where the authentication server authenticates a supplicant using an authenticator. The authentication server trusts the authenticator to forward correct authentication information received from the supplicant to the authentication server. However, the authentication process as defined in the standards requires that the supplicant have a direct communication channel with the authenticator.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
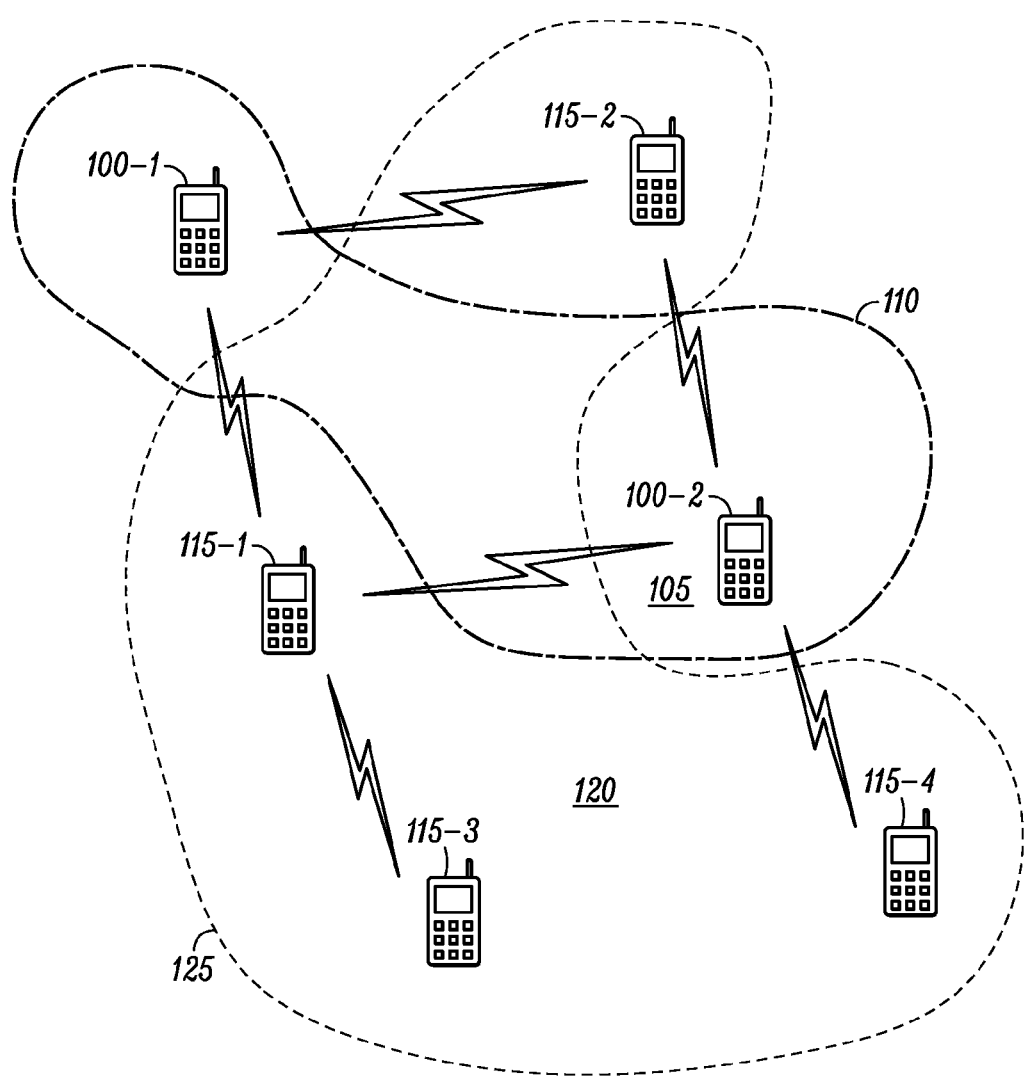
FIG. 1 is a schematic diagram illustrating network interactions used to propagate authentication data across networks, according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to propagating mutual authentication data in wireless communication networks. Accordingly, the apparatus components and method steps have been represented where appropriate by conventional symbols in the drawings, showing only those specific details that are pertinent to understanding the embodiments of the present invention, so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of propagating mutual authentication data in wireless communication networks as described herein. The non-processor circuits may include, but are not limited to, a radio receiver, a radio transmitter, signal drivers, clock circuits, power source circuits, and user input devices. As such, these functions may be interpreted as steps of a method for propagating mutual authentication data in wireless communication networks. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

One embodiment of the present invention employs nodes from two independent ad hoc wireless networks to propagate authentication data through both networks. For example, two independent response teams may arrive at an incident scene where the two teams will need to operate together. The incident scene may include for example a crime scene, a fire scene, an accident scene, a biological or a chemical hazard scene, or any other type of emergency or otherwise critical scene. Thus consider, for example, that the first response team comprises police officers and the second response team comprises firefighters. The police officers communicate with each other using a first secure ad hoc wireless network, and the firefighters communicate with each other using a second secure ad hoc wireless network. Because neither ad hoc network involves traditional network infrastructure such as base stations, it can be difficult to enable the two networks to authenticate each other using prior art techniques such as Extensible Authentication Protocol (EAP) Over Local Area Network (EAPOL) packets. However, as described in detail below, an embodiment of the present invention enables mutual authentication data to be propagated using multi-hop communications through both secure ad hoc wireless networks, so that the police officers and the firefighters can securely communicate with each other. That results effectively in a single "super network" that comprises nodes from both secure ad hoc wireless networks.

Referring to FIG. 1, a schematic diagram illustrates network interactions used to propagate authentication data across networks, according to an embodiment of the present invention. Two nodes 100-$n$ (i.e., 100-1, 100-2) are shown as members of a first secure ad hoc wireless communication network 105 defined by line 110. Four other nodes 115-$n$ (i.e., 115-1, 115-2, 115-3, 115-4) are shown as members of a second secure ad hoc wireless communication network 120 defined by line 125. For example, as described above, the nodes 100-$n$ may be associated with a group of police officers and the nodes 115-$n$ may be associated with a group of firefighters, where both groups have arrived at an incident scene and need to communicate with each other. Each node 100-$n$, 115-$n$ may comprise, for example, a wireless device such as a mobile telephone, a personal digital assistant (PDA), a notebook computer, or the like. Initially, the nodes 100-$n$ may be unable to securely communicate with the nodes 115-$n$ because no mutual authentication has occurred between the first network 105 and the second network 120.

According to an embodiment of the present invention, the node 115-1 operating in the second network 120 completes a mutual authentication process with the node 100-2 operating in the first network 105. For example, the police officer associated with the node 100-2 and the firefighter associated with the node 115-1 can meet face-to-face and agree that their respective networks 105, 120 should trust each other and should be combined into a single super network. The super network will comprise all of the nodes 100-$n$ and all of the nodes 115-$n$, enabling secure communications between both networks 105, 120. Further, such mutual authentication enables a node 100-$n$ operating in the network 105 to act as an intermediate node in a multi-hop communication between two nodes 115-$n$ operating in the network 120.

The mutual authentication process can include a user of the node 100-2 manually authorizing trust of a certificate issued by a trust anchor associated with the other network 120. Similarly, a user of the node 115-1 manually authorizes trust of a certificate issued by a trust anchor associated with the other network 105. After the manual authentication completes, the certificates can be exchanged between the node 100-2 and the node 115-1 using for example a transport layer security (TLS) protocol.

After the mutual authentication is completed, the node 100-2 and the node 115-1 propagate authentication related information throughout both the network 105 and the network 120. For example the node 115-1 can transmit a unification message to the node 100-1, which is operating in the network 105. The unification message informs the node 100-1 that the node 115-1 is capable of communicating both with nodes 115-$n$ and with nodes 100-$n$. According to an embodiment of the present invention, the unification message can comprise an authentication certificate, such as a certificate conforming to an International Telecommunication Union (ITU) X.509 standard. The authentication certificate thus provides to the node 115-1 authorization from a trust anchor associated with the network 105. The node 115-1 thus uses the unification message to advertise that it can act as a trust bridge between the network 105 and the network 120. To ensure that the unification message will be received, accepted and processed by the node 100-1, the unification message can be transmitted to the node 100-1 as a broadcast message. For example, such a broadcast message can comprise a beacon that includes a service set identifier (SSID) of the network 105.

In response to the unification message, the node 100-1 also can seek to become mutually authenticated with both networks 105, 120. That can be accomplished by relaying authentication messages, through the node 115-1, between the node 100-1 and the node 100-2. Similar relaying of authentication messages can then occur through other nodes 100-$n$, 115-$n$ until all of the nodes 100-$n$, 115-$n$ are mutually authenticated with both networks 105, 120. According to one embodiment of the present invention, such relaying of authentication messages can be performed as described in U.S. patent application Ser. No. 11/108,999, filed on Apr. 19, 2005, entitled "System And Methods For Providing Multi-Hop Access In A Communications Network", assigned to the assignee of the present invention, which application is hereby incorporated by reference herein in its entirety. Such relaying of authentication messages is defined herein as an IEEE 802.1X relay authentication method.

Figure 2:
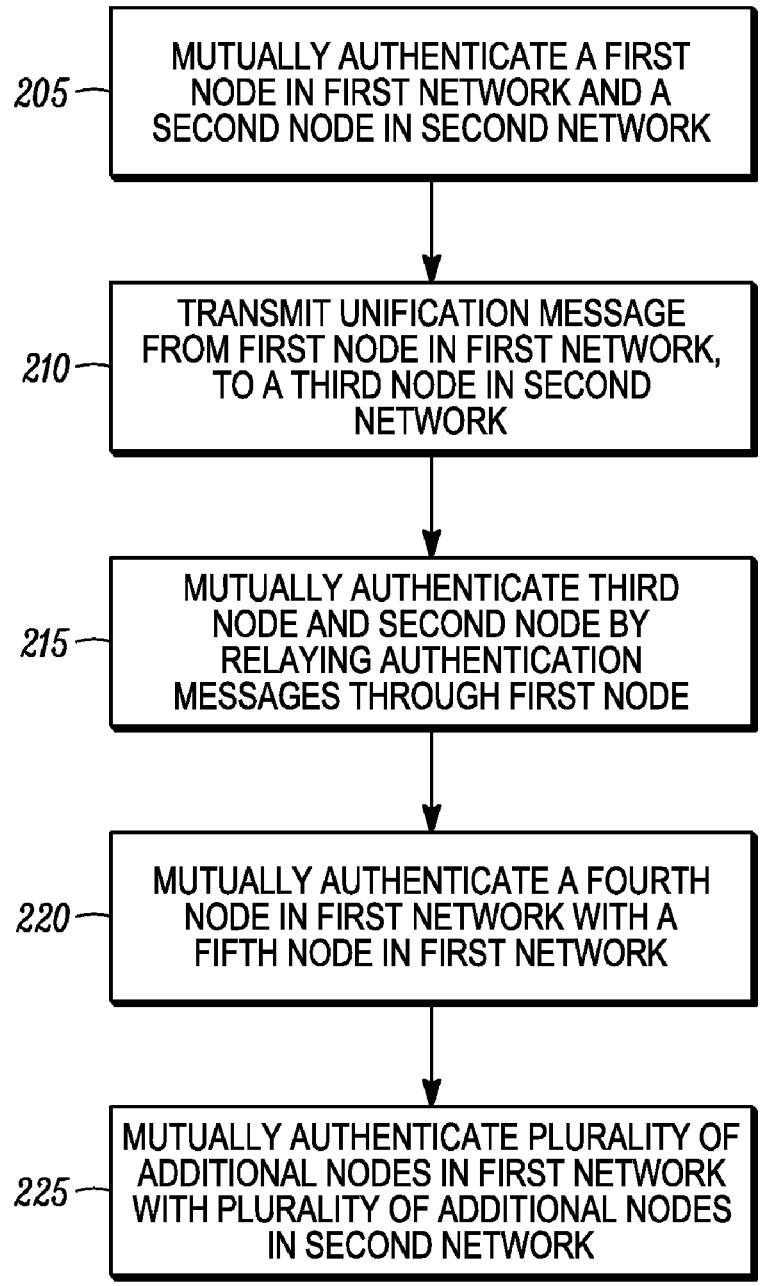
FIG. 2 is a general flow diagram illustrating a method for propagating mutual authentication data through both a first ad hoc wireless communication network and a second ad hoc wireless communication network, according to an embodiment of the present invention.

Referring to FIG. 2, a general flow diagram illustrates a method 200 for propagating mutual authentication data through both a first ad hoc wireless communication network and a second ad hoc wireless communication network, according to an embodiment of the present invention. At step 205, a first node operating in the first network and a second node operating in the second network are mutually authenticated. For example, as described above in reference to FIG. 1, a user of the node 100-2, operating in the network 105, manually authorizes trust of a certificate issued by a trust anchor associated with the other network 120. Similarly, a user of the node 115-1, operating in the network 120, manually authorizes trust of a certificate issued by a trust anchor associated with the other network 105.

At step 210, a unification message is transmitted from the first node to a third node operating in the second network, where the unification message indicates that the first node is authenticated with the second network. For example, as described above in reference to FIG. 1, after the mutual authentication is completed, the node 115-1 can transmit a unification message to the node 100-1, which is operating in the network 105. The unification message informs the node 100-1 that the node 115-1 is capable of communicating both with nodes 115-$n$ and with nodes 100-$n$.

At step 215, in response to the unification message, the third node and the second node are mutually authenticated by relaying authentication messages through the first node. For example, as described above in reference to FIG. 1, the node 100-1, performing as the third node described in step 215, also can seek to become mutually authenticated with both networks 105, 120. That can be accomplished by relaying authentication messages, through the node 115-1, between the node 100-1 and the node 100-2.

At step 220, a fourth node operating in the first network and a fifth node operating in the first network are mutually authenticated. Finally, at step 225, a plurality of additional nodes operating in the first network are mutually authenticated, using the method steps described above, with a plurality of additional nodes operating in the second network.

Figure 3:
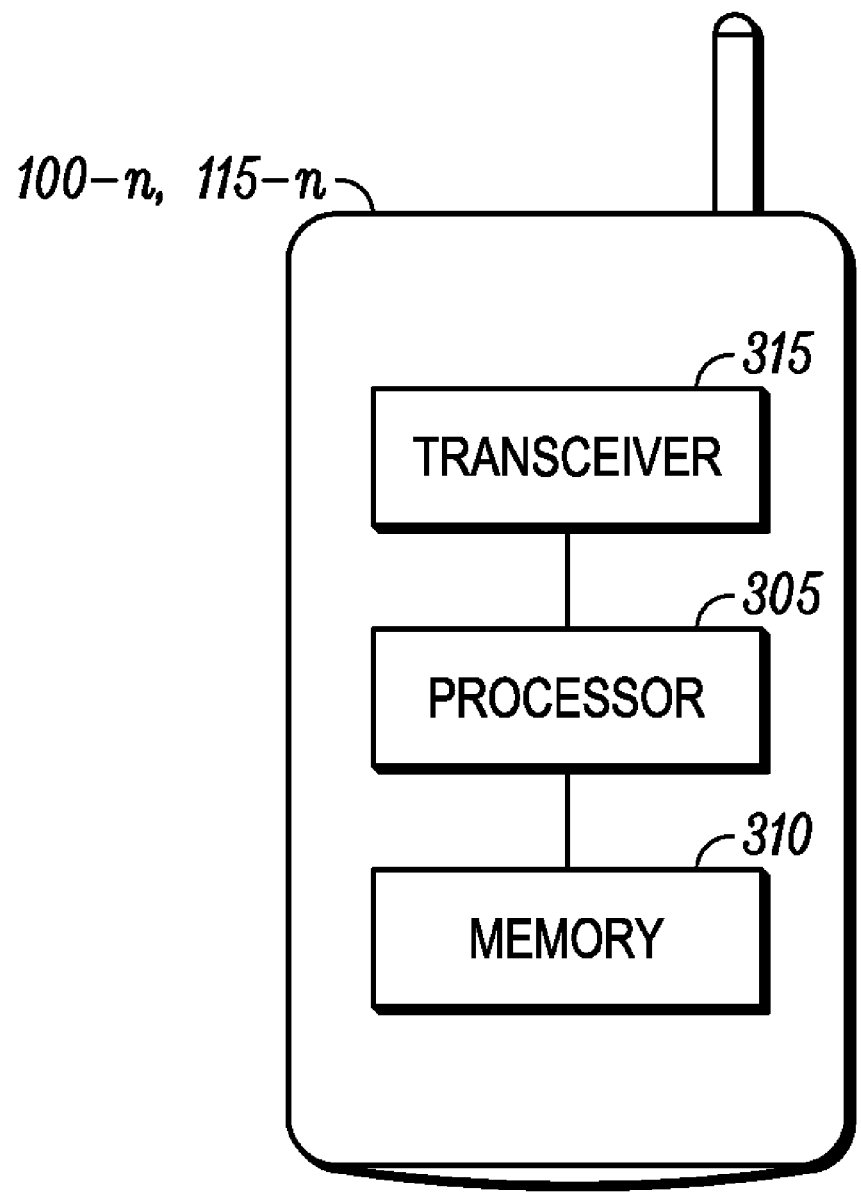
FIG. 3 is a block diagram illustrating components of a network node, according to an embodiment of the present invention.

Referring to FIG. 3, a block diagram illustrates components of a network node, such as a node 100-n or a node 115-n, according to an embodiment of the present invention. Those skilled in the art will recognize that the present invention can be embodied in a system of such a network node. For example, a system of a node 100-n or a node 115-n can include a processor 305 such as a standard microprocessor or application specific integrated circuit (ASIC) operatively coupled to a memory 310. The memory 310 comprises a computer readable medium such as a random access memory (e.g., static random access memory (SRAM)), read only memory (e.g., programmable read only memory (PROM), or erasable programmable read only memory (EPROM)), or hybrid memory (e.g., FLASH) as is well known in the art. The medium then comprises computer readable program code components that, when processed by the processor 305, are configured to cause the execution of the above described steps of the method 200. Communications such as those involved in the method 200 are then transmitted from or received by a transceiver 315 that is operatively coupled to the processor 305.

Advantages of the present invention thus include enabling two independent ad hoc wireless communication networks to be mutually authenticated. That effectively results in a single super network, where nodes from a first network can securely communicate with nodes from a second network, using multi-hop communications through nodes from both the first and second networks. Further, those skilled in the art will appreciate that the teachings of the present invention also enable three or more independent ad hoc wireless communication networks to be mutually authenticated. Authentication related information can be propagated through the networks using authentication certificates, so that a node that is mutually authenticated with more than one network can identify a chain of trust that links to established trust anchors associated with each network.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. A method for propagating mutual authentication data in both a first wireless communication network and a second wireless communication network, the method comprising:

mutually authenticating a first node of a plurality of nodes operating in the first wireless communication network and a second node of a plurality of nodes operating in the second wireless communication network, wherein the plurality of nodes in the first wireless communication network is unable to securely communicate with the plurality of nodes in the second wireless communication network;

transmitting a unification message from the first node to a third node of the plurality of nodes operating in the second wireless communication network, where the unification message indicates that the first node is capable of securely communicating with the plurality of nodes in the first wireless communication network and the plurality of nodes in the second wireless communication network; and relaying through the first node, in response to the unification message, authentication messages from the third node and the second node, for mutually authenticating the third node and the second node.

2. The method of claim 1, wherein mutually authenticating the first node and the second node comprises:

a user of the first node manually authorizing trust of a certificate received from the second node; and a user of the second node manually authorizing trust of a certificate received from the first node.

3. The method of claim 1, further comprising mutually authenticating the plurality of other nodes in the first network with the plurality of other nodes in the second network, whereby a single super network is created comprising nodes in the first wireless communication network and nodes in the second wireless communication network.

4. The method of claim 1, wherein the unification message comprises an authentication certificate that provides authorization to the first node from a trust anchor associated with the second wireless communication network.

5. The method of claim 4, wherein the authentication certificate is a digital certificate conforming to an International Telecommunication Union (ITU) X.509 standard.

6. The method of claim 1, wherein the unification message is transmitted as a broadcast message to the third node.

7. The method of claim 6, wherein the broadcast message is a beacon and includes a service set identifier (SSID) used by the second network.

8. The method of claim 1, wherein the unification message is transmitted to the plurality of nodes operating in the first wireless communication network and to the plurality of nodes operating in the second wireless communication network.

9. The method of claim 1, wherein mutually authenticating the first node and the second node comprises exchanging certificates between the first node and the second node using a transport layer security (TLS) protocol.

10. The method of claim 1, further comprising:

mutually authenticating a fourth node operating in the first wireless communication network with a fifth node operating in the first wireless communication network by relaying authentication messages through the third node.

11. The method of claim 1, wherein mutually authenticating the third node and the second node is performed using an IEEE 802.1X relay authentication method.

12. A system for propagating mutual authentication data in both a first wireless communication network and a second wireless communication network, the system comprising:

computer readable program code components configured to cause mutual authentication of a first node of a plurality of nodes operating in the first wireless communication network and a second node of a plurality of nodes operating in the second wireless communication network, wherein the plurality of nodes in the first wireless communication network is unable to securely communicate with the plurality of nodes in the second wireless communication network;

computer readable program code components configured to cause transmission of a unification message from the first node to a third node operating in the second wireless communication network, where the unification message indicates that the first node is capable of securely communicating with the plurality of nodes in the first wireless communication network and the plurality of nodes in the second wireless communication network; and computer readable program code components configured to cause relaying through the first node, in response to the unification message, of authentication messages from the third node and the second node, for mutually authenticating the third node and the second node.

13. The system of claim 12, wherein the unification message comprises an authentication certificate that provides authorization to the first node from a trust anchor associated with the second wireless communication network.

14. The system of claim 13, wherein the authentication certificate is a digital certificate conforming to an International Telecommunication Union (ITU) X.509 standard.

15. The system of claim 12, wherein the unification message is transmitted as a broadcast message to the third node.

16. The system of claim 15, wherein the broadcast message is a beacon and includes a service set identifier (SSID) used by the second wireless communication network.

17. The system of claim 12, wherein the unification message is transmitted to the plurality of nodes operating in the first wireless communication network and to the plurality of nodes operating in the second wireless communication network.

18. The system of claim 12, wherein mutually authenticating the first node and the second node comprises exchanging certificates between the first node and the second node using a transport layer security (TLS) protocol.

19. The system of claim 12, wherein mutually authenticating the third node and the second node is performed using an IEEE 802.1X relay authentication method.

20. A system for propagating mutual authentication data in both a first wireless communication network and a second wireless communication network, the system comprising:

means for mutually authenticating a first node of a plurality of nodes operating in the first wireless communication network and a second node of a plurality of nodes operating in the second wireless communication network, wherein the plurality of nodes in the first wireless communication network is unable to securely communicate with the plurality of nodes in the second wireless communication network;

means for transmitting a unification message from the first node to a third node operating in the second wireless communication network, where the unification message indicates that the first node is capable of securely communicating with the plurality of nodes in the first wireless communication network and the plurality of nodes in the second wireless communication network; and means for relaying through the first node, in response to the unification message, authentication messages from the third node and the second node, for mutually authenticating the third node and the second node.

\* \* \* \* \*